Oct. 8, 1968 W. B. CAMPBELL 3,404,831
TURBINE BUCKET SUPPORTING STRUCTURE
Filed Dec. 7, 1966 3 Sheets-Sheet 1
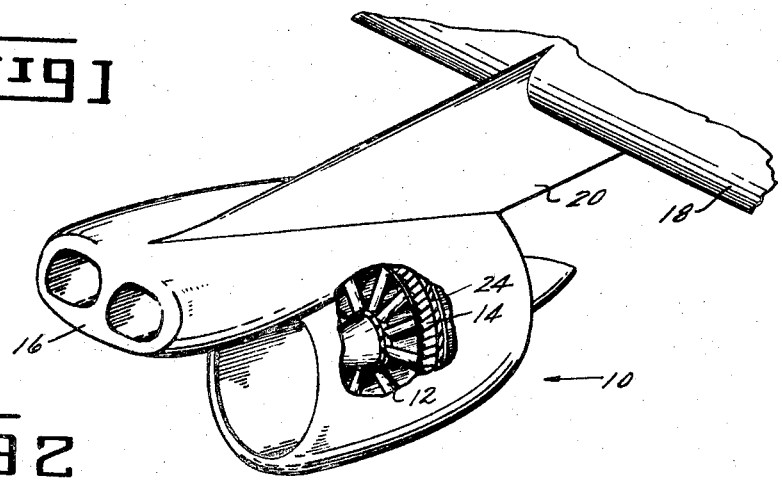
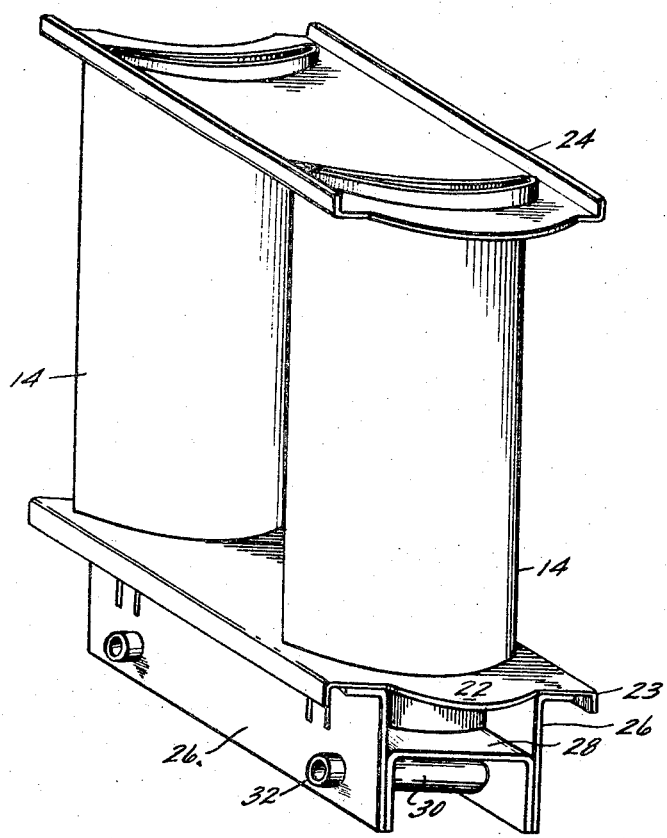
INVENTOR.
WILLIAM B. CAMPBELL
BY
John F. Cullen
ATTORNEY—

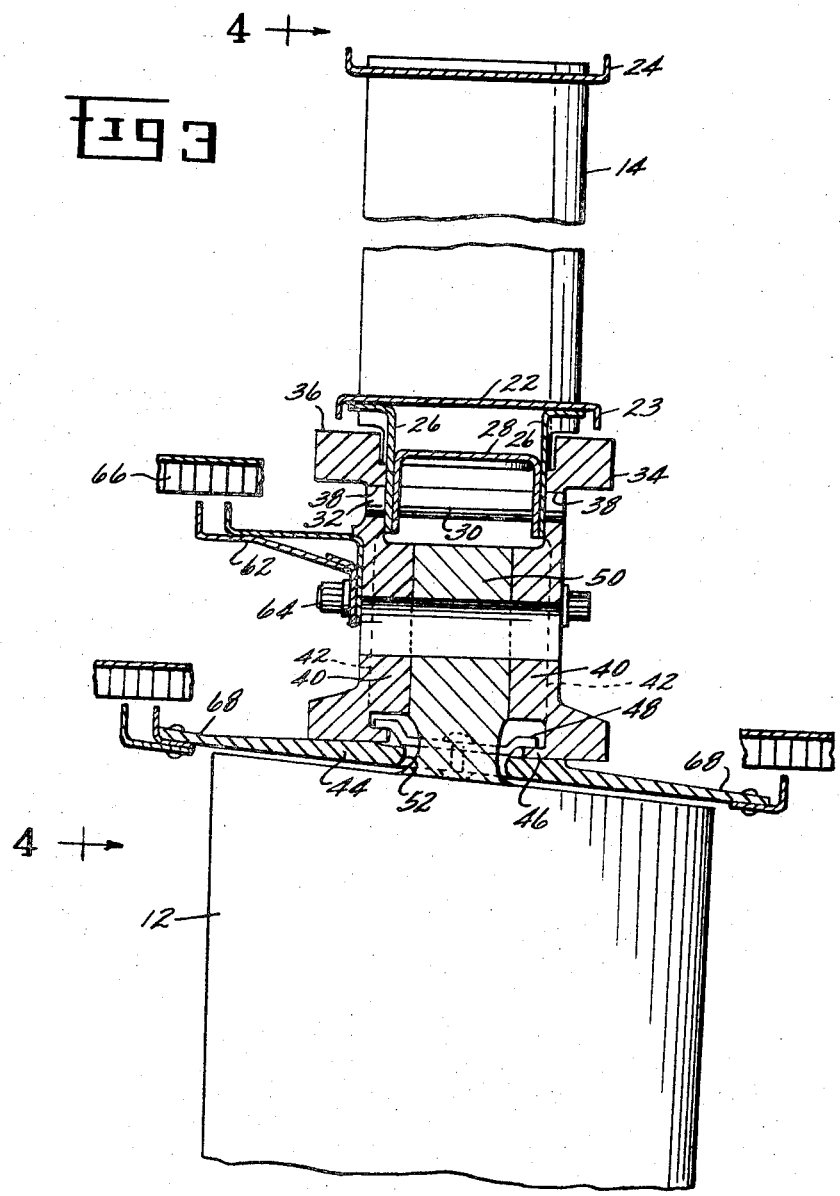

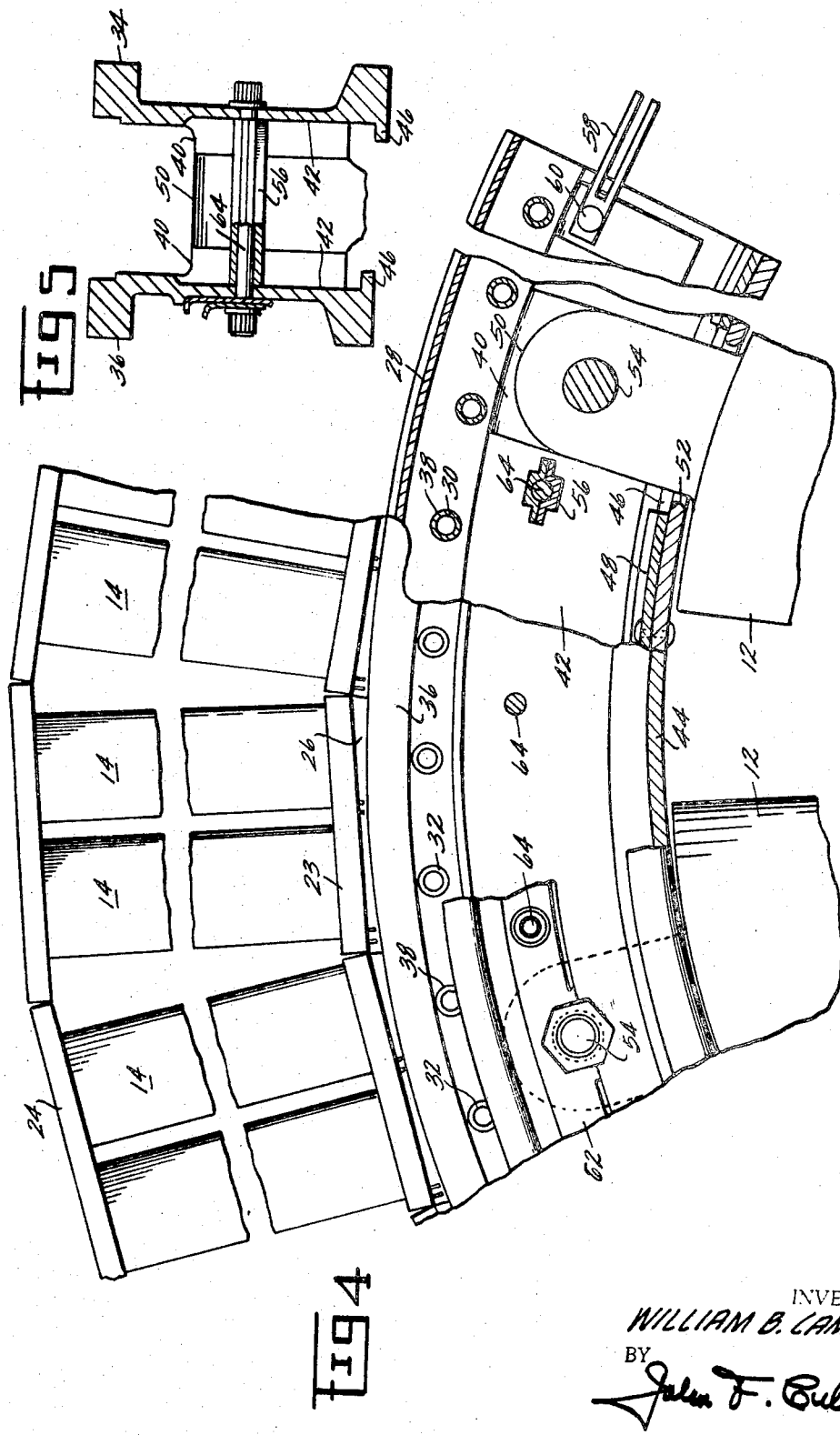

United States Patent Office 3,404,831
Patented Oct. 8, 1968

3,404,831
TURBINE BUCKET SUPPORTING STRUCTURE
William B. Campbell, Cincinnati, Ohio, assignor to General Electric Company, a corporation of New York
Filed Dec. 7, 1966, Ser. No. 599,820
8 Claims. (Cl. 230—116)

ABSTRACT OF THE DISCLOSURE

The invention relates generally to tip turbine fan rotors and is directed to a take-apart arrangement whereby packages of turbine buckets may be easily and quickly replaced in the event of damage without extensive repair or rework of much of the prime supporting structure.

---

In aircraft turbine engines it is always desirable to reduce weight and provide for easy maintenance. Weight reduction is accomplished by hollowing the parts while retaining their outer dimensions and airfoil characteristics but removing unnecessary mass. In maintenance it is desirable to replace individual turbine buckets without costly repair of the entire prime supporting structure or the need to tear down the prime structure for access for replacement. Consequently, it is customary to segment or reduce the large components into parts that may be easily replaced or maintained. Typical of such structure is that shown in U.S. Patent 3,132,842 of common assignment of which the present invention is an improvement. All replaceable and lightweight structure must be provided without introducing any structural weakness to the components.

The main object of the invention is to provide a turbine bucket supporting structure which lends itself to easy disassembly for replacement of damaged parts.

Another object is to provide such a structure whereby individual packages of turbine buckets may be easily replaced or repaired without affecting the prime rotor structure.

An important object is the provision of easily replaceable segmented turbine packages which are made up of straight line elements as opposed to the customary curved elements.

An object is to provide supporting structure of the type noted which requires only simple and common tooling in the manufacture of the individual turbine bucket packages.

Briefly stated, the invention provides a turbine bucket supporting structure for use in a fan rotor such as a tip turbine fan. The supporting structure secures hollow turbine buckets in segmented packages to the fan blades. There is provided a plurality of generally radially directed buckets that are joined by a base plate and a tip shroud at inner and outer ends. The base plate is provided with a pair of spaced radial side members and preferably a second parallel coextensive base plate that is spaced inward of the main base plate and connected to the side members and to the buckets. These plates, side members, and shroud are formed of simply bent sheet metal and, significantly, of straight sections requiring no complex metal forming. Suitable peripherally spaced tubular means extend through the side members and protrude from them. Thus, there is formed a box base structure which, with the turbine buckets and shroud, forms a segmented peripheral turbine package of any number of plurality of buckets. This structure may all be fabricated and bonded together as by welding or brazing or the like. This is the package that may be easily replaced in the event of foreign object damage (FOD) or the like. A pair of spaced radially extending side rails is provided to extend at least peripherally beyond the base ends and the rails are spaced radially inward of the package base. The rails have apertures that rotatably receive the tubular protrusions of the turbine package. Each rail is provided with peripherally spaced bosses on the surface that faces the opposite rail and a peripheral sealing band is removably clamped to the inner end of the side rails to span the rails and form a box structure with the side rails. The band has spaced peripheral openings to receive radially directed fan extensions such as tangs on the fan blades and bolt means are provided to extend through the side rails and extensions to clamp the rails to the fan, thereby loosely retaining the turbine packages in the clamping structure by the engagement with the protrusions. Torque transmission is provided by peripheral straps connecting adjacent rail ends along the periphery. The straight line turbine package structure permits the turbine buckets to be equally spaced and disposed at right angles in and to the base and shroud so they are parallel to a radial line of the rotor. Additional sealing means and cross-supporting members between the side rails are provided as required.

While the specification concludes with claims particularly pointing out and distinctly claiming the subject matter which is regarded as the invention, it is believed the invention will be better understood from the following description taken in connection with the accompanying drawings in which:

FIG. 1 is a perspective view of a typical powerplant employing the turbine bucket supporting structure of the invention;

FIG. 2 is a perspective view of a typical two bucket fabricated turbine package;

FIG. 3 is a partial cross-sectional view at the outer end of a fan blade illustrating the details of the supporting structure;

FIG. 4 is a partial cut-away view looking in on FIG. 3 from the direction of arrows 4—4; and FIG. 5 is a partial cross-sectional view illustrating spaced cross supporting members as required.

Referring first to FIG. 1, there is shown a general powerplant of the type that could use the structure of the invention. This comprises a generally large diameter cruise or lift-cruise fan engine 10 that includes a rotor made up of fan blades 12 which support tip turbine buckets 14. Power is supplied to the rotor by gas generator means such as jet engines 16 whose exhaust gases drive the buckets 14 to rotate the fan and provide thrust by movement of large masses of relatively low velocity air through the engine 10. This type of powerplant may be supported in any suitable manner such as from a wing 18 or by pylon 20. Powerplants of this general type are shown in U.S. Patent 3,229,933 of common assignment.

Extremely large diameter powerplants of this general type may reach diameters of 8 to 10 feet and use hundreds of turbine buckets on the fan periphery so are expensive to repair or maintain in the event of damage such as FOD. In large powerplants, it is known to segment or provide individually replaceable parts so that smaller components may be handled without the need for throwing away or having to repair or disassemble the prime supporting structure such as the rotor including fan blades 12. It is desired to provide easy replacement of the turbine buckets whereby simple fabricated or formed packages may be easily substituted when needed and the instant invention directs itself to this structure.

Referring to FIG. 2, there is shown an individual turbine bucket package which is designed to be easily removed and replaced as a package when needed. It will be understood that any suitable number of buckets 14 may be provided in a package but for the purpose of description dual or a pair of buckets will be described. To this end, a pair of hollow adjacent sheet metal turbine buckets 14 have a base plate 22 at the inner end and a shroud 24 at the outer end by which the generally radially directed buckets 14 are peripherally connected. Flange seal extensions 23 may be provided. For necessary strength and support for the turbine buckets, the base plate is provided with a pair of connected spaced radially extending side members 26. For additional strength in supporting the inner ends of the buckets a second channel or parallel base plate 28 spaced radially inward of base plate 22 may be provided and plates 22 and 28 are connected to side members 26 in any suitable manner, preferably by bonding as by brazing or welding or the like. In order to lend further strength and for a purpose to be described, side members 26 having peripherally spaced tubular means 30 extending through the side members and secured thereto and protruding from the side members as shown to provide protrusions 32. These act as shear pins as will become apparent. The structure comprising parts 22, 26, 28, and 30 form a box base structure on the inner end of the buckets and thereby complete the integral one-piece turbine package as shown in FIG. 2.

This turbine package may be made up of straight sheet metal sections when used on large hub radius ratio engines of the type described. The hub radius ratio is the ratio of the radius of the inner ends of the buckets to the radius of the outer ends of the buckets. In large powerplants this approaches unity and the straight sections described may be used. The use of non-curved sections or straight peripheral sections in the turbine package makes for easy and inexpensive fabrication of the package since no complex tooling is required and no metal forming is required. Only simple bending of the sheet metal parts is necessary and with the use of straight sections the spacing for the turbine buckets in base plates 22 and 28 may be made with the same tooling as the equivalent spacing in tip shroud 24. In other words, buckets 14 are parallel and of constant solidity from root to tip. Above a radius ratio of .5 this parallel bucket construction may be considered and is therefore desired in large powerplants. Thus, the buckets are generally radially directed but are parallel to a radius from the center of the rotor and are at right angles to their base plates and tip shroud. It will be apparent that adjacent buckets of different packages will have a slight divergency because each package has parallel buckets. However, in the large radius ratio machines this causes no penalty. As a result, a complete wheel of the turbine packages described is a geometrical circle of short straight-sided sections as opposed to a curved or round structure.

In order to attach and support the turbine bucket package of FIG. 2, reference is now made to FIG. 3 which shows the detailed supporting structure and includes a pair of spaced radially directed side rails 34 and 36 that may be curved and are intended to support plural turbine packages of the type shown in FIG. 2. Thus, the side rails are segmented to extend peripherally beyond the base 22 of the turbine bucket package as seen in FIG. 4 and are disposed radially inward of the package as shown in FIG. 3. In order to support a plurality of the individual turbine packages on each rail segment, the side rails 34 and 36 have apertures 38 into which the protrusions 32 loosely or rotatably fit. Thus, this shear connection retains the turbine package in the side rails. The side rails are provided with peripherally spaced bosses 40 on the facing surfaces and the side rails are cut-away between the bosses to the inner section shown by the dotted line 42. The side rails, in conjunction with the turbine packages, thus complete three sides of a box structure. The fourth side is closed by a peripheral sealing band 44 that spans the inner ends of the side rails and is preferably coextensive with the side rails. Preferably, the side rails are formed with suitable lips 46 or equivalent that cooperate with tab 48 so that the sealing band 44 may be removably clamped to the side rails. Any suitable connection of the type described is sufficient.

In order to connect the structure to the rotor represented by fan blades 12, the blades have radial extensions or tangs 50. Band 44 is provided with openings 52 adjacent the bosses to receive the extensions 50. Thus, the fan extensions 50 are disposed between the bosses, as shown in FIG. 3, and the entire structure is then clamped by a securing means such as bolts 54. It will be apparent that the surface between extensions 50 and the interfaces of the bosses may be flat as shown or serrated or any other suitable surface. It should also be noted that the dimensions of the extensions and bosses are such that when the bolt 54 clamps down tightly to secure the rails and extensions together, the base of the turbine package at 26 is not clamped or pinched but is loosely retained between the side rails by the shear action on tubular means 30.

In order to provide stiffness to the side rails 34 and 36 when they are assembled, it may be necessary to include spaced cross-supporting members 56 as shown in FIG. 5 and these may conveniently be disposed between the bolt means 54 and of a length to act in conjunction with the bosses 40 to prevent deflection of the side rails out of a radial plane.

For transmission of torque to the rotor between the adjacent rail ends of individual segments, there is provided means such as straps 58 that cooperate with studs 60 on the rails and peripherally interconnect adjacent rails. These straps 58 may have suitable slots to allow for expansion between the parts if necessary.

It is undesirable to allow leakage of the high pressure hot gases through turbine buckets 14 into the fan stream and to this end, suitable sealing structure may be used. This structure may comprise the flange seal 23 and additional sealing means 62 fastened by bolts 64 to the rails. The bolts may extend through the cross-members 56 to form a dual function of also holding members 56 in place. Seal 62 cooperates with stator structure such as honeycomb seal 66. Additionally, sealing band 44 may extend well beyond the side rails and fan blades as shown to provide sealing extremities 68 as required.

In the event replacement is required of a turbine package, it is necessary merely to unfasten bolts 54 and remove straps 58 from studs 60 and slide the assembly off of extensions 50. Then, bolts 64 may be removed and one of the side rails may then be lifted off to expose a series of turbine packages of the type shown in FIG. 2. The damaged package may be lifted off, replaced, the side rail replaced and the rebolting performed.

It will be apparent that this take-apart structure provides for easy replacement or repair of the individual turbine packages and avoids an all bonded construction which may require the repair or replacement of the primary supporting fan structure. Additionally, the individual turbine packages may be made up of any number of individual turbine buckets per package and a plurality of packages are fastened to each segment of side rails. With the only bonded construction being the turbine package, this invention provides easy interchange of different materials having weight-temperature-strength advantages for different uses.

While there has been described a preferred form of the invention, obviously modifications and variations are possible in light of the above teachings. It is therefore to be understood that within the scope of the appended claims, the invention may be practiced otherwise than as specifically described.

I claim:
1. A supporting structure for securing turbine buckets to a rotor comprising:
   a plurality of generally radially directed buckets,
   a base plate and tip shroud peripherally connecting said buckets at inner and outer ends respectively,
   said base plate having connected parallel side members, peripherally spaced means securely extending through and protruding from said side members to form a box base structure whereby a peripheral turbine package is formed, a pair of segmented spaced side rails extending along the base periphery, said rails having apertures receiving the protrusions, peripherally spaced bosses on the facing surfaces of said guide rails, a peripheral band connected to and spanning the inner ends of said side rails and having openings therein to receive radial rotor extensions, connecting means extending through said side rails and extensions to clamp said rails to the rotor and retain adjacent turbine packages by said protrusions, and means connecting the peripheral ends of adjacent rail segments for torque transmission to the rotor.

2. Apparatus as described in claim 1 wherein said tip shroud and box base structures are formed peripherally of straight sections and said turbine buckets are disposed between the shroud and base substantially at right angles thereto and parallel to a radial line.

3. Apparatus as described in claim 2 wherein said shroud and base structures are sheet metal and bonded to said buckets and protrusion means to form an integral one-piece turbine package.

4. Apparatus as described in claim 3 having spaced cross-supporting members between said rails and peripherally disposed between said means connecting said rails and extensions.

5. In combination:

a rotor member, a plurality of fan blades secured to the rotor and having radial extensions thereon, a supporting structure for securing hollow turbine buckets to said fan blades comprising, a plurality of generally radially directed buckets, a base plate and tip shroud peripherally connecting said buckets at inner and outer ends respectively, said base plate having a pair of spaced radially extending side members connected thereto, a second parallel base plate spaced radially inward of said base plate and connected to said side members and buckets, peripherally spaced tubular means securely extending through and protruding from said side members to form with said base plates and members a box base structure whereby a peripheral turbine package is formed, a pair of segmented spaced radially directed side rails extending beyond the base periphery and disposed radially inward thereof, said rails having apertures rotatably receiving the tubular protrusions, peripherally spaced bosses on the facing surfaces of said side rails, a peripheral sealing band removably clamped to and spanning the inner ends of said side rails and coextensive therewith to form a second box structure with said rails, said band having spaced peripheral openings therein to receive said radially directed fan extensions, bolt means extending through said side rails and extensions to clamp said rails to the fan and loosely retain adjacent turbine packages by said protrusions, and straps peripherally connecting the ends of adjacent rail segments for torque transmission to the rotor.

6. Apparatus as described in claim 5 wherein said tip shroud and box base structure are formed peripherally of straight sections and said turbine buckets are disposed between the shroud and base substantially at right angles thereto and parallel to a radial line.

7. Apparatus as described in claim 6 wherein said tip shroud and base structure are sheet metal and bonded in equal spacings to said buckets and tubular means to form an integral one-piece turbine package.

8. Apparatus as described in claim 7 having spaced cross-supporting members between said rails and peripherally disposed between said bolt means connecting said rails and extensions.

References Cited

UNITED STATES PATENTS

| | | |
|---|---|---|
| 2,518,660 | 8/1950 | Browne. |
| 3,070,284 | 12/1962 | Kent. |
| 3,132,842 | 5/1964 | Tharp. |

EVERETTE A. POWELL, JR., *Primary Examiner.*